(12) United States Patent
Muneki et al.

(10) Patent No.: US 6,189,255 B1
(45) Date of Patent: Feb. 20, 2001

(54) HOLLOW TELESCOPIC FISHING ROD

(75) Inventors: Okada Muneki; Morimoto Kazuya, both of Sakai (JP)

(73) Assignee: Shimano, Inc. (JP)

( * ) Notice: Under 35 U.S.C. 154(b), the term of this patent shall be extended for 502 days.

(21) Appl. No.: 08/572,727

(22) Filed: Dec. 14, 1995

(30) Foreign Application Priority Data

Dec. 27, 1994 (JP) .................................................. 6-324808

(51) Int. Cl.[7] .................................................. A01K 87/04
(52) U.S. Cl. .................................................. 43/24; 43/18.1
(58) Field of Search ................ 43/18.1, 18.5, 43/24

(56) References Cited

U.S. PATENT DOCUMENTS

| | | | | |
|---|---|---|---|---|
| 5,188,152 | * | 2/1993 | Ogawa | 43/18.5 |
| 5,328,742 | * | 7/1994 | Tukihara | 43/18.1 |
| 5,488,797 | * | 2/1996 | Akiba | 43/18.1 |

FOREIGN PATENT DOCUMENTS

| | | | | |
|---|---|---|---|---|
| 1-304836 | * | 12/1989 | (JP) . | |
| 3-67554 | * | 7/1991 | (JP) . | |
| 4-341133 | * | 11/1992 | (JP) . | |
| 5-276853 | * | 10/1993 | (JP) | 43/18.1 |
| 5-88259 | * | 12/1993 | (JP) . | |

* cited by examiner

Primary Examiner—Joseph J. Hail, III
(74) Attorney, Agent, or Firm—Jeffer, Mangels, Butler & Marmaro LLP

(57) ABSTRACT

A hollow telescopic fishing rod has a fishing rod body which includes a plurality of fishing rod body sections made from fiber-reinforced resin. The fishing rod body has an inner surface, an internal path for a fishing line and line-holding protrusions made from the fiber-reinforced resin, preferably by means of monobloc forming together with said fishing rod body sections. The line-holding protrusions are formed on the inner surface in a spiral, and the line-holding protrusions have a cross-sectional shape which is a trapezoid whose upside corners are arc-shaped.

11 Claims, 3 Drawing Sheets

HOLLOW TELESCOPIC FISHING ROD

FIELD OF THE INVENTION

This invention relates to a hollow telescopic fishing rod which has an internal path for a fishing line.

BACKGROUND OF THE INVENTION

In a hollow telescopic fishing rod, a fishing line passes through a path for the fishing line installed inside the fishing rod body at times of winding and dewinding. At such times, the line touches the inner surface of the path for the line, producing friction resistance which results in difficulties in smooth winding and dewinding of the line.

To alleviate this problem, a technology to reduce such friction resistance has been proposed. In the Japanese Provisional Publication No. 341133 of the 1992 Official Gazette, there is an introduction of a technology to bury guide rings made of a linear substance whose cross-sectional shape is a circle inside the rod body, allowing part of each ring to project out from the inner circumference of the path for the line. There, the intention is to reduce the friction resistance by holding a fishing line away from the inner circumference of the path for the line by the linear substance whose cross-sectional shape is a circle.

This technology, however, raises a problem in that the linear substance easily comes off the rod body, as part of the linear substance is simply buried in the rod body. The linear substance, whose cross-sectional shape is a circle, and a fishing line whose cross-sectional shape is also a circle make a point contact. Large stress is given to the contact point and the linear substance can easily come off. There is also a problem in that the linear substance or the fishing line could wear out or the durability of the fishing line could be hindered.

The technology indicated in the Japanese Patent Application No. 88259 of 1993 has been proposed to solve such problems. This technology is to form concaves and convexes in a spiral on the inner surface of the rod body. This is done by winding resin tape around a mandrel, which is used to manufacture the rod body of fiber-reinforced resin. The resin tape is wound in a spiral, prepreg is wound over it, the assembly is hardened in a customary way, for example by baking. Then, the resin tape is removed from the inner surface of the manufactured rod body. The concaves and convexes formed in a spiral are used as a structure to support the fishing line. In the case of this technology, the convexes in a spiral which work to support the line are made by monobloc forming using the same material as the fishing rod body. The convexes hardly come off the rod body and hence have excellent durability. As the top surface of the convexes have a certain area, the contact area with the fishing line is adequate and generation of excessive contact stress given to the convexes or to the line can be avoided.

According to the aforesaid technology which employs the convexes placed in a spiral, a great variance could be generated in the line-holding function depending on the positioning of the convexes in the spiral. In certain configurations of the convexes, the contact stress to the line could be excessive and the line could wear out. Even in the cases in which the convexes are formed in monobloc with the rod body, when the contact resistance given by the line becomes excessive or when it is used for a long time, those convexes could come off the main body of the rod or be deformed.

The objective of this invention is to sufficiently reduce the contact resistance given to the line as well as to improve the durability of the line and the line-holding structure by preventing damage to them.

SUMMARY OF THE PREFERRED EMBODIMENTS

According to one aspect of the present invention, there is provided a hollow telescopic fishing rod including a fishing rod body which includes a plurality of fishing rod body sections made from fiber-reinforced resin. The fishing rod body has an inner surface, an internal path for a fishing line and line-holding protrusions made from the fiber-reinforced resin, preferably by means of monobloc forming together with said fishing rod body sections. The line-holding protrusions are formed on the inner surface in a spiral, and the line-holding protrusions have a cross-sectional shape which is a trapezoid whose upside corners are arc-shaped.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Figure 1:
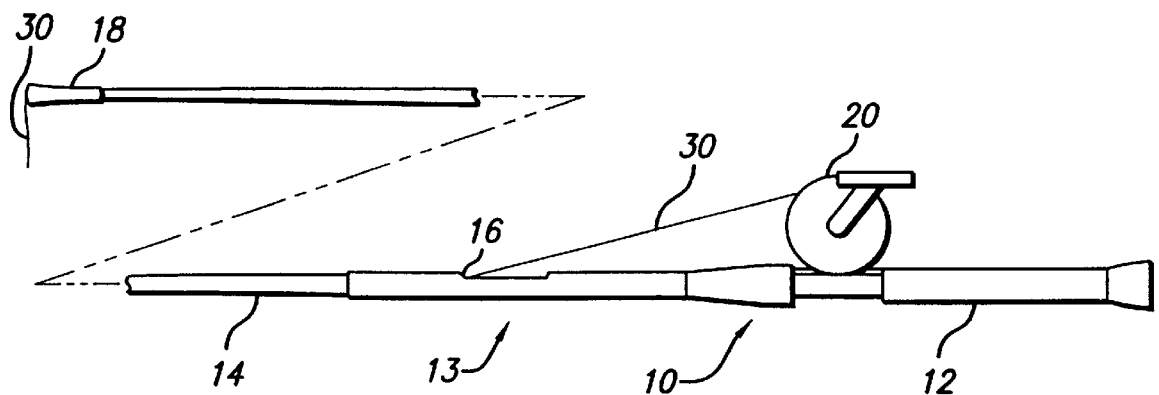
FIG. 1 is a front view of the hollow telescopic fishing rod which represents the working examples of the inventions.

In one preferred embodiment of the hollow telescopic fishing rod of the present invention, the line-holding protrusions placed in a spiral are formed in monobloc with the fishing rod body from fiber-reinforced resin. Therefore, manufacturing is easier and line-holding protrusions hardly come off or become damaged even when they receive contact resistance from the fishing line in comparison with the cases where line-holding protrusions are structured by separate materials.

As the cross-sections of the line-holding protrusions are trapezoid-shaped, their physical strength and durability are better than rectangle-shaped protrusions, hence peeling-off or damage of the line-holding protrusions can be avoided. Because the line touches the flat surface of the upside of the trapezoid, contact length with the line can be adequately assured and stress produced at contact points can be less in comparison with the case of point contact. As a result, abrasion at the contact points can be mitigated and damage of the fishing line due to excessive stress can be avoided.

As the upside corners of the trapezoid are arc-shaped, the line does not become damaged by touching the corners. Also, the corners do not chip off. And as contact between the line-holding protrusions and the line is smooth, the contact resistance is reduced and winding/unwinding of the line is made easy.

In another preferred embodiment of the hollow telescopic fishing rod of the present invention, the lower side corners of the trapezoid which forms the cross-section of the line-holding protrusions are arc-shaped. When the contact resistance is given to the line-holding protrusions by the line, large stress is generated at the aforesaid lower side corners. Therefore, by making the lower side corners, where such large stress is generated, arc-shaped, concentration of the stress can be mitigated. Hence physical strength and durability of the line-holding protrusions can be improved.

According to a further embodiment of the hollow telescopic fishing rod of the present invention, the width of the lower side of the trapezoid which forms the cross-section of the line-holding protrusions is between 0.6 and 1.2 mm. Therefore, an adequate area of contact of each line-holding protrusion and the line can be assured and the strength and durability of the line-holding protrusions can be improved. If this width is too narrow, the strength and durability of the line-holding protrusions would be deteriorated. If this width is too big, the width of the upside of the trapezoid should be widened accordingly, hence winding and unwinding of the line would become more difficult due to increased contact resistance made by the line.

In yet another preferred embodiment of the present invention, the height of the trapezoid which forms the cross-section of the line-holding protrusions is 0.2 mm to 0.6 mm. In this manner, the line can be held in a good position, keeping an adequate distance from the inner surface of the path for the line within the rod body. If the line-holding protrusions are made too high, the inner space of the path for the line would be too narrow and passage of the line would be less smooth. And in the case of hollow telescopic fishing rods, a fishing rod body section of each stage is designed to store the rod body section of the adjacent stage. Therefore, if the inner space of the rod body section is narrow, it would interfere with the storage of the adjacent fishing rod body section. If the line holding-protrusions were made too low, when the wet line passes through, water would stay between the inner surface of the path for the line and the line. This would produce a resistance against the movement of the line, hence winding and unwinding of the line would be more difficult. Even if the line is not wet, the moving line may be shaken and touch the inner surface of the path for the line resulting in increased resistance against the line.

Figure 2:
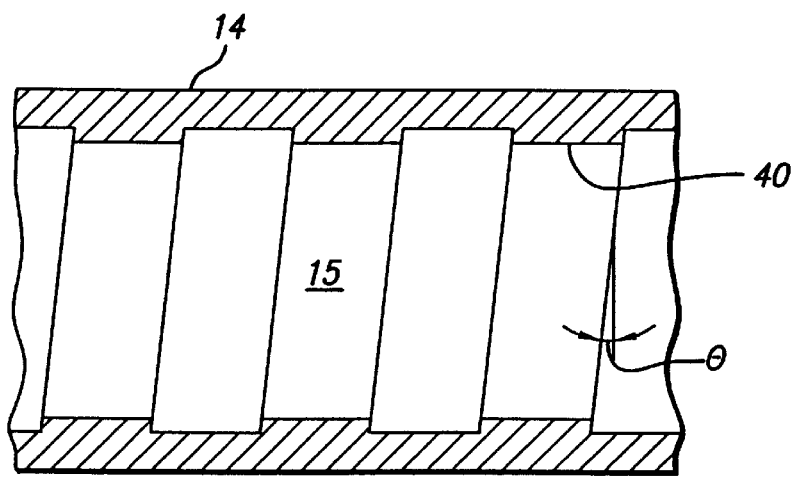
FIG. 2 is an enlarged cross-sectional view of the fishing rod body.

In still another embodiment of the present invention, the lead angle θ (as shown in FIG. 2) of the spiral where the line-holding protrusions are placed is set at 50 degrees or less, assuring the smooth passage of the line. If the lead angle is too wide, the contact length between the line and the protrusions becomes too long and the contact resistance would be increased. In particular, when the line is wet, the water which exists at the contact point generates resistance. The longer this contact length is, the higher the contact resistance becomes. Furthermore, it is difficult to produce the line-holding protrusions with a large lead angle from the manufacturing technology point of view.

The hollow telescopic fishing rod of the present invention may also preferably have reinforcing fibers of the fiber-reinforced resin composing the line-holding protrusions that are twisted yarn. Fine splits are hardly made even if the reinforcing fibers are exposed by abrasion of the line-holding protrusions due to contact with the line. Also the reinforcing fibers scarcely produce naps during the winding process in the manufacturing.

In the hollow telescopic fishing rod of another preferred embodiment of the present invention, the volume fraction of the reinforced fibers to the resin in the fiber-reinforced resin composing the line-holding protrusions is 50–70%. Wear and abrasion resistance is high and sufficient strength can be assured. If this volume fraction is less than 50%, the wear and abrasion resistance is not high enough and if this volume fraction exceeds 70%, adhesion performance of the fiber-reinforced resin composing the line-holding protrusions and the fiber-reinforced resin composing the main body of the fishing rod will be lowered.

As employed herein, the term "fishing rod" denotes a complete fishing rod including accessories such as a reel sheet, grip, cap, etc. The term "fishing rod body" (or "rod body") denotes the fishing rod without the foregoing accessories. The term "fishing rod body section" (or "rod body section") denotes each separate part of the fishing rod body.

The term "arc-shaped" as used herein denotes a shape having a cross-section which is a smooth curve, such as a portion of a circle, ellipse or oval.

Turning now to the drawings, a hollow telescopic fishing rod (10) as shown in FIG. 1 has a grip (12) to manipulate the hollow telescopic fishing rod (10) and a fishing rod body (13) comprised of a plurality of telescoping fishing rod body sections (14), the first of which is connected to the front end of the grip (12). The fishing rod body sections (14) are formed of fiber-reinforced resin. A reel (20) to wind/unwind the line (30) is attached to the grip (12). The fishing rod body (13) is cylindrical and has an aperture (16) to insert the line (30) at the grip. The fishing rod body (13) has a tube guide (18) for the line at its tip. The line (30) which is drawn out from the reel (20) is inserted via the aperture (16) into the fishing rod body (13) and drawn outside via the guide (18) for the line.

As shown in FIG. 2, there is a path (15) for the line within the inside of each of the fishing rod body sections (14) forming the fishing rod body (13). On the inner surface of the path (15) for the line, line-holding protrusions (40) positioned in a spiral are formed in monobloc with the fishing rod body sections (14).

Figure 3:
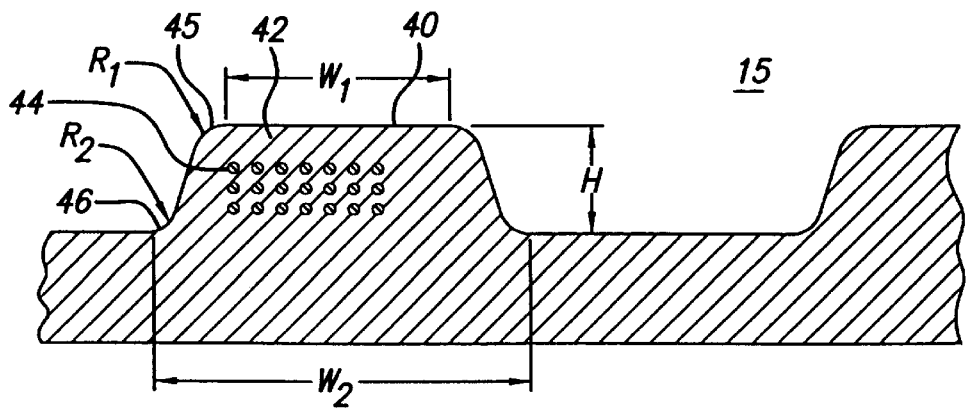
FIG. 3 is an enlarged cross-sectional view of the line-holding protrusions.

As shown in FIG. 3, the cross-section of each line-holding protrusion (40) is trapezoid-shaped and the lower side, which is wider, is connected to the inner surface of the path (15) for the line and the upside, which is narrower, is projecting to the central side of the path (15) for the line. The upside corners (45) of the line-holding protrusions (40) are arc-shaped. Lower side corners (46) of the line-holding protrusions (40) can also be arc-shaped.

Reinforcing fibers (44) preferably form lines inside the line-holding protrusions (40). The reinforcing fibers (44) are placed almost in parallel with the spiral direction of the line-holding protrusions (40) which form a spiral. The reinforcing fibers (44) preferably used are called Tyrrano fibers (SiC fibers). The main ingredients of Tyrrano fibers are the elements Si, C and O. Also the elements Ti, B and N can be included in the fibers. The fibers are typically used in the form of 0.8 K×4-ply (160 turn-plies) with a fiber diameter of 8.5 $\mu$m.

The preferred dimensions of each line-holding protrusion (40) are as follows: the width of the lower side (W2) is between 0.6 and 1.2 mm; the width of the upside (W1) is a little shorter than the width of the lower side as the shape is a trapezoid; the height (H) is between 0.2 and 0.6 mm; the lead angle (θ) (see FIG. 2) of the spiral is 50° or less; the arc portion (45) of the upside corners is a circular arc of which the radius R1=0.05–2 mm and the arc portion (46) of the lower side corners is a circular arc of which the radius R2=0.05–2 mm.

In order to install the line-holding protrusions which have the aforesaid structure in the fishing rod body sections (14), known technology, for example the manufacturing technology detailed in the foregoing Japanese Utility Application No. 88259 of 1993, Official Gazette, is available. By adjusting parameters such as width, thickness and winding lead angle of the resin tape to be wound around the mandrel to produce the fishing rod body sections (14) or by varying characteristics of the prepreg, characteristics of the synthetic resin and reinforcing fibers which compose the prepreg, etc., in the manufacturing processes, the aforesaid configuration of the line-holding protrusions can be obtained.

The present invention is further illustrated by the following non-limiting examples.

EXAMPLE 1

Figure 4A:
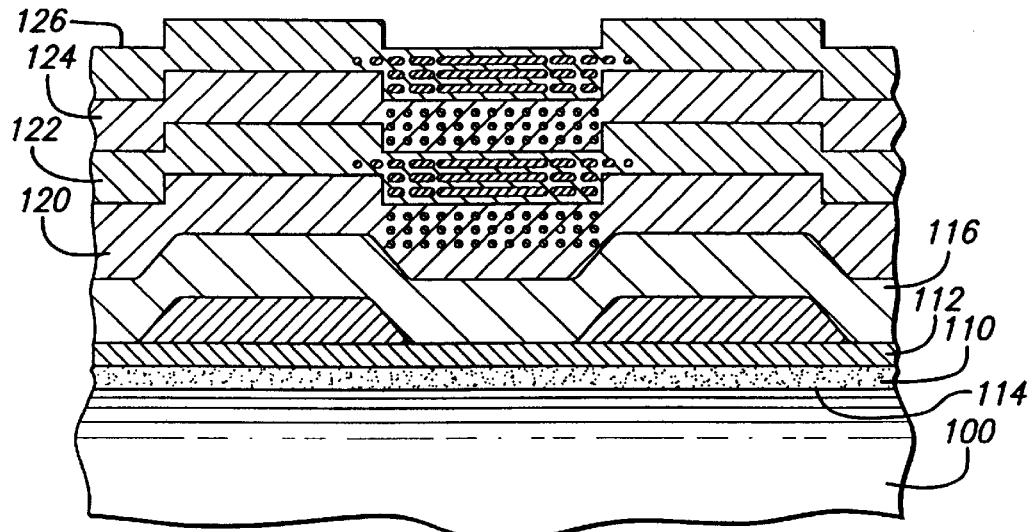
FIGS. 4(a) and (b) are cross-sectional views of the fishing rod body (a) in the process of manufacturing and (b) after manufacturing to show the manufacturing method.

As shown in FIG. 4(a), mold releasing agent (110) made of wax is applied to the outer circumference of a mandrel (100). Mold releasing tape (112) made of polypropylene, etc. is wound over the mold releasing agent (110). Protrusion tape (114) corresponding to the configuration of the line-holding protrusions (40) is wound around the outer circumference of the mold releasing tape (112) at a fixed pitch to maintain certain intervals in a spiral. The protrusion tape (114) is a tape whose base material is cloth. Over the protrusion tape (114), the mold releasing tape (116), which is identical with the aforesaid mold releasing tape, is wound closely. On the outer circumference of the mold releasing tape (116), spiral protrusions, whose cross-sections are trapezoid, are formed corresponding to the configuration of the outer circumference of the protrusion tape (114). The cross-section of the protrusion tape (114) is square-shaped prior to winding, but is pushed to the side of the mandrel (100) and deformed into a trapezoid by being wound over the mandrel (100) closely and is pressurized by the mold releasing tape (116). Protrusion tape (114), whose cross section is trapezoid-shaped from the beginning, may also be used.

Over the mold releasing tape (116), multi-layered prepreg is placed. For the prepreg layers 120–126, a sheet prepreg and a prepreg tape which are resin impregnated with reinforcing fibers, such as carbon fibers, are used.

For the inner-most prepreg layer (120), prepreg tape, in which reinforcing fibers are placed in the tape-length direction of the tape, is wound in the same direction as the spiral direction of the protrusion tape (114). As a result, the placement direction of the reinforcing fibers within the prepreg layer (120) almost conforms with the spiral direction of the protrusion tape (114) alongside of the circumferential direction of the mandrel (100).

The second layer of prepreg (122) is made of prepreg tape in which reinforcing fibers are placed in the tape-width direction, or alternatively by winding a prepreg sheet in which reinforcing fibers are placed in the longitudinal direction around the mandrel (100) so that the longitudinal direction is parallel to the axial direction of the mandrel.

For the third layer of prepreg (124), the same prepreg tape as the inner-most layer of prepreg (120) is used and the reinforcing fibers are placed in the circumferential direction of the mandrel (100).

The fourth layer of prepreg (126) is made by the same method as the second layer of prepreg (122) and the reinforcing fibers are placed in the axial direction of the mandrel (100).

Figure 4B:
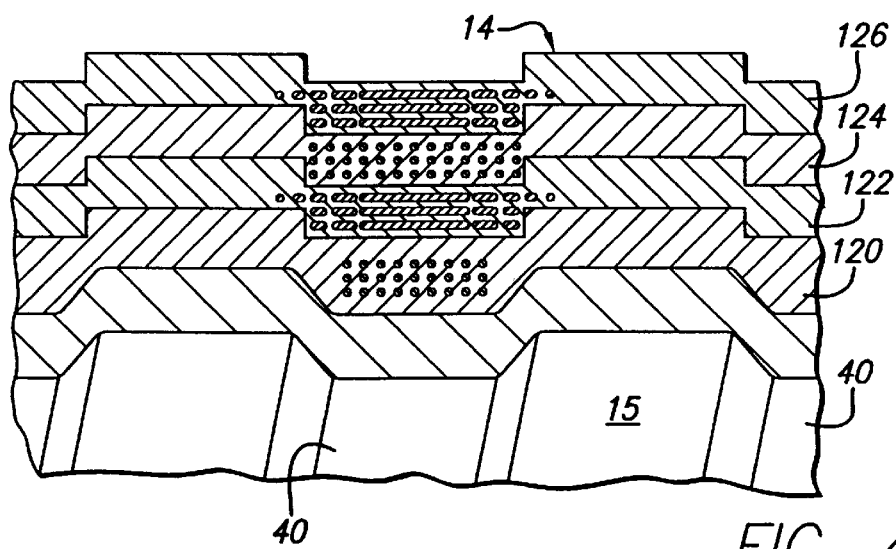

After the four-layered prepreg 120–126 is placed as mentioned above, form-maintaining tape which is made of polyethylene terephthalate (PET) or polypropylene (not shown) is wound around the outer circumference of it and then it is hardened in a customary way. After hardening in a customary way, the form-maintaining tape is peeled off and when the mold releasing tape (112) for the inner-circumference, the protrusion tape (114) and the mold releasing tape (116) are all removed, the fishing rod body section (14) as shown in FIG. 4(b) is obtained. A plurality of rod body sections (14) of increasing diameter are combined to form a fishing rod body (13).

On the inner-circumference of the fishing rod body section (14), the path (15) for the line whose cross-sectional view is a circle is formed. On the inner-circumferential surface of the path (15) for the line, spiral line-holding protrusions whose cross-sectional view is a trapezoid are formed. Although each prepreg layer (120–126) is depicted separately for easier understanding in the FIG. 4(b), all prepreg layers (120–126) in the fishing rod body section (14) are formed in monobloc.

The shape of the cross-section of each line-holding protrusion (40) is a trapezoid in which corners of the upside and the lower side are arc-shaped. This is because corners of the concave-convex shape of the protrusion tape (114) and mold releasing tape (116) have some roundness and corners of the resin become rounded during the forming process due to the characteristics of the resin. It is possible to form arc portions (45 and 46) in the line-holding protrusions (40) without having formed the corners of the protrusion tape (114) into arcs.

In a preferred embodiment, as the mold releasing tape (116) made of polypropylene resin is used, some surfactant is attached to the surface of the mold releasing tape (116). This surfactant makes the surface of the trough part between two line-holding protrusions (40) on the inner circumferential surface of the fishing rod body (14) hydrophilic. As a result, water drops are rarely made in the trough portion between two line-holding protrusions (40) and excellent water discharging performance can be obtained.

EXAMPLE 2

In this example, the basic processes are the same as those for the foregoing Example 1, with the following differences.

Figure 5:
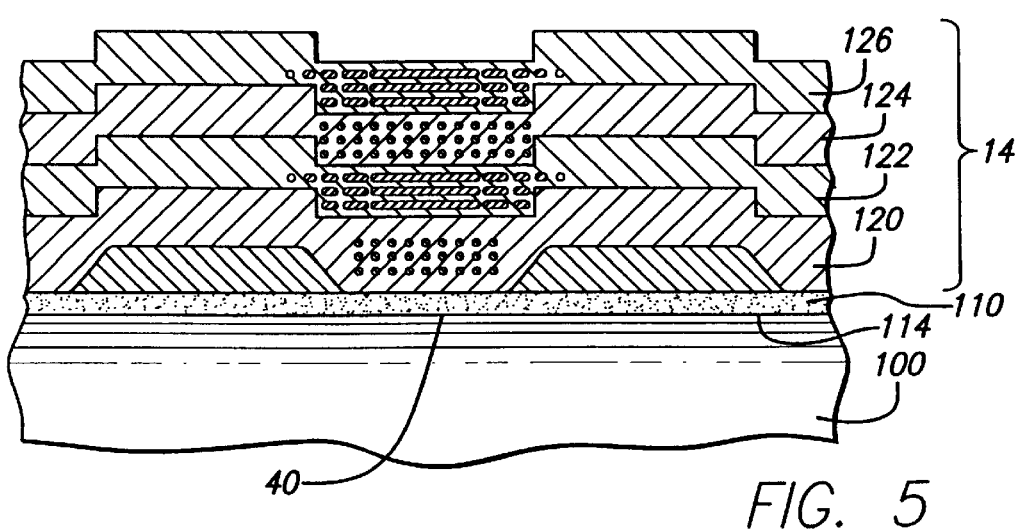
FIG. 5 is a cross-sectional view of the fishing rod body in the process of manufacturing to show another manufacturing method.

As shown in FIG. 5, mold releasing agent (110) is applied to the outer circumferential surface of the mandrel (100). The protrusion tape (114) is directly wound over this mold releasing agent (110) in a spiral and prepreg layers (120–126) are placed directly on the outer circumferential surface of the protrusion tape (114) without placing mold releasing tape in between. The subsequent processes are the same as for the foregoing Example 1.

In Example 2, the manufacturing processes can be simplified in comparison with Example 1 as the mold releasing tapes (112 and 116) are not necessary. However, as the protrusion tape (114) and the prepreg layer (120) directly touch each other, a tape which has good releasability must be used for the protrusion tape (114).

As part of the inner circumferential surface of the prepreg layer (120) touches the mold releasing agent (110) in the forming process, the mold releasing agent (110) is attached also to the tip of the post-manufacturing line-holding protrusions. Hence the water-repellence of the surfaces of the line-holding protrusions can be improved.

Furthermore, by applying surface processing to the protrusion tape (114), the surface of the prepreg layer (120) to which the protrusion tape (114) touches, i.e., the surface of the path (15) for the line in the trough portion produced between two line-holding protrusions (40), can be made hydrophilic. By doing so, as water runs alongside the trough portion of the path (15) for the line which has the hydrophilicity, discharging of the water which has entered into the inside of the fishing rod body (13) can be done excellently.

EXAMPLE 3

Figure 6:
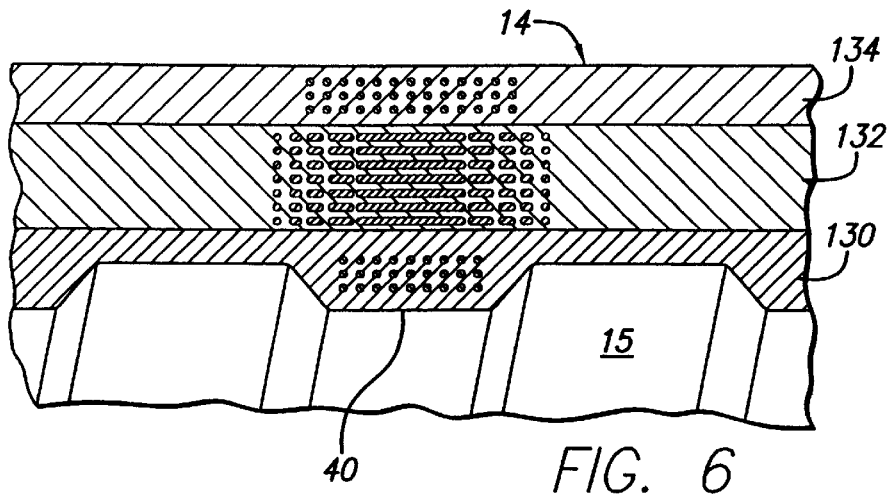
FIG. 6 is a cross-sectional view of the fishing rod body after manufacturing to show another manufacturing method.

The basic processes are the same as those for Example 2. As shown in FIG. 6, the fishing rod body section (14) is composed of prepreg layers 130–134. In the inner-most prepreg layer (130), reinforcing fibers are placed in the spiral direction of the line-holding protrusions (40). In the outer prepreg layer (134), reinforcing fibers are placed in almost a right angle against the axis of the fishing rod body (14), i.e., in the circumferential direction. In the interim prepreg layer (132), reinforcing fibers are placed alongside the axial direction of the fishing rod body section (14) and the layer is formed thicker than the inner and outer prepreg layers (130 and 134). Specifically, the interim layer (132) may be about three times as thick as the inner layer (130) or outer layer (134).

EXAMPLE 4

Figure 7:
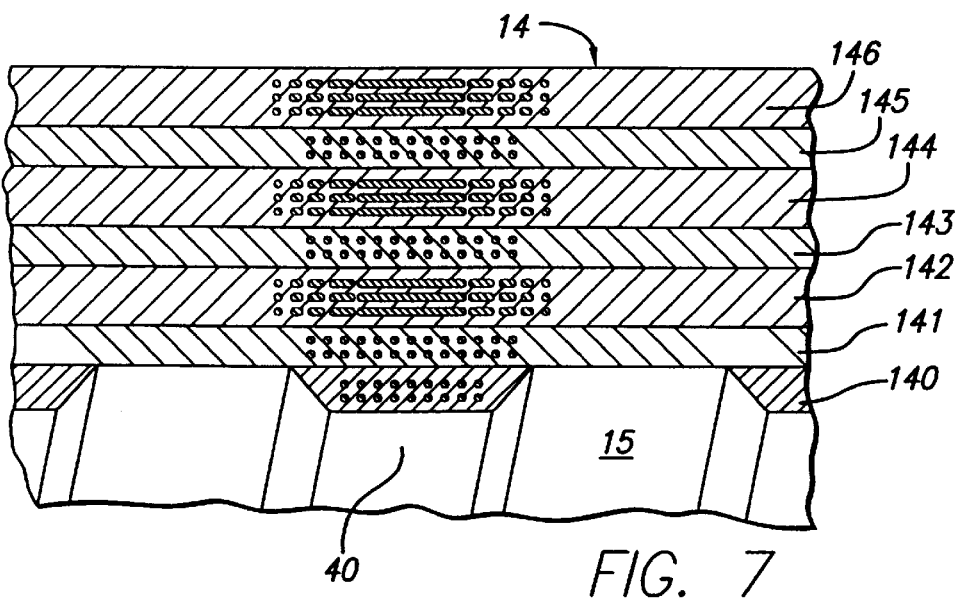
FIG. 7 is a cross-sectional view of the fishing rod body after manufacturing to show another manufacturing method.

The basic processes are the same as those for Example 2. As shown in FIG. 7, the fishing rod body section (14) is composed of prepreg layers (140, 142, 144 and 146) and glass-cloth layers (141, 143 and 145) each of which lies between the prepreg layers (140–146).

The inner-most prepreg layer (140) is placed only in the portions of the line-holding protrusions (40). Specifically speaking, the prepreg layer (140) is formed by applying the mold releasing agent (110) to the mandrel (100), winding the protrusion tape (114) around it in a spiral, and then winding the prepreg tape to fill out the intervals of the protrusion tape (114). The direction of the reinforcing fibers of the prepreg layer (140) agrees with the spiral direction of the protrusion tape (114).

Glass-cloth layer (141) is placed on the flat surface which is composed of the prepreg layer (140) and the outer circumferential surface of the protrusion tape (114). The glass-cloth layers (141, 143, 145) and the prepreg layers (142, 144, 146) are overlaid by turns. In the prepreg layers (142, 144, 146) but for the layer (140), the reinforcing fibers are placed in the axial direction of the fishing rod body section (14). By laying the glass-cloth layers (141, 143, 145) between the layers of prepregs (140, 142, 144, 146), reinforcing fibers are placed in the axial direction of the fishing rod body section (14) and dispersion of the prepreg layers (142, 144, 146), which are easy to disperse otherwise, can be avoided.

EXAMPLE 5

Figure 8:
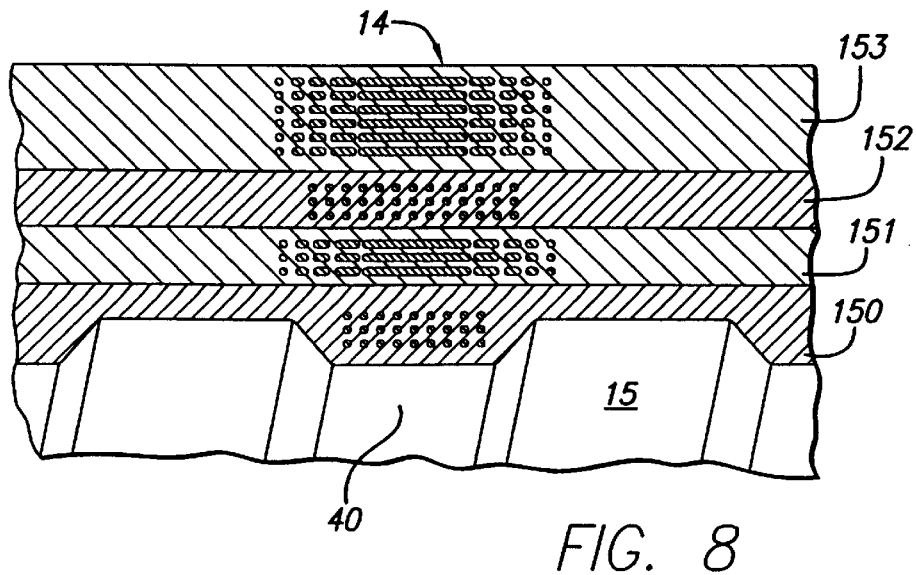
FIG. 8 is a cross-sectional view of the fishing rod body after manufacturing to show another manufacturing method.

The basic processes are the same as those for Example 2. As shown in FIG. 8, the fishing rod body section (14) is composed of the prepreg layers (150–153).

In the inner-most prepreg layer (150) and the third prepreg layer (152), the reinforcing fibers are placed alongside of the circumferential direction of the fishing rod body (14), and in the second prepreg layer (151) and the outer prepreg layer (153), the reinforcing fibers are placed in the axial direction of the fishing rod body (14). The outer prepreg layer (153) is made about three to five times as thick as other prepreg layers (151, 152). By employing such lamination structure, a fishing rod body section (14) can be made with high bending strength.

Alternative structures of the hollow telescopic fishing rod (10) in addition to the examples shown in the drawings are possible by properly combining structures which are the same as the ordinary hollow telescopic fishing rods. Structures of parts such as the reel (20), grip (12), aperture to insert the line (16) and line guide (18) could be the same as the structures of the ordinary hollow telescopic fishing rods.

Materials of the fiber-reinforced resin composing the fishing rod body sections (14) and the line-holding protrusions (40) may also be the materials which are used for the ordinary fishing rods. The reinforcing fibers to be buried in the line-holding protrusions (40) may be the same reinforcing fibers in the fiber-reinforced resin constituting the fishing rod body sections (14).

Although it is ideal that the cross-sectional shape and dimensions of the line-holding protrusions (40) have all the conditions stated in the foregoing examples, part of the shape and dimensions may be changed and still not go beyond the scope of the present invention.

The line-holding protrusions (40) may be placed either in the entire length of the fishing rod body (13) or only in certain parts of the rod so far as they are sufficient to hold the line (30). The shape and dimensions of the line-holding protrusions may vary depending on the places of the fishing rod body (13). The line-holding protrusions (40) of the present invention may be used together with conventional line-holding structures.

Thermosetting resins such as epoxy resin may be used as the resin of the fiber-reinforced resin constituting the fishing rod body sections (14) including the line-holding protrusions (40). It is also possible to employ thermoplastic resins. As reinforcing fibers, reinforcing fibers which are used for the ordinary fiber-reinforced resin such as carbon fibers or boron fibers can be used.

Alternative manufacturing methods other than the foregoing manufacturing examples can be available by properly combining the materials, lamination structures and manufacturing processes described in each of the examples. Also, already-known fishing-line manufacturing technologies which are not stated in the foregoing manufacturing examples may be combined.

As the mold releasing agent (110 and 118), ordinary mold releasing agents such as a silicone may be used as well as the wax which has been mentioned above.

The protrusion tape (114) to be used during the manufacturing processes may be structured by combining materials such as cloth, synthetic resin and rubber. For example, acetate cloth to which pressure-sensitive adhesive of the thermosetting rubber system is applied may be used.

As a manufacturing process, after the fishing rod body sections (14) and the line-holding protrusions (40) are formed by aforementioned hardening in a customary way, polishing of the surface of the line-holding protrusions (40) in order to process the shape of the line-holding protrusions (40) may be added.

The hollow telescopic fishing rod of an embodiment of this invention can sufficiently reduce the contact resistance against the line by having the foregoing line-holding protrusions and allows smooth winding/unwinding of the line. On top of that, the invention can prevent the damage of the line and the line-holding protrusions hence improving their durability.

The hollow telescopic fishing rod of an embodiment of this invention makes it possible to heighten the strength and improve the durability of the line-holding protrusions by making the lower side corners of the trapezoid which forms the cross-sectional view of the line-holding protrusions arc-shaped.

The hollow telescopic fishing rod of another embodiment of this invention makes it possible to heighten the strength and improve the durability of the line-holding protrusions by setting 0.6–1.2 mm for the width of the lower side of the trapezoid forming the cross-section of the line-holding protrusions.

The hollow telescopic fishing rod of yet another embodiment of this invention realizes holding of the line in a good condition and smooth winding/unwinding of the line by setting 0.2–0.6 mm for the height of the trapezoid forming the cross-section of the line-holding protrusions.

The hollow telescopic fishing rod of a still further embodiment of this invention realizes holding of the line in a good condition and smooth winding/unwinding of the line by setting 50° or less for the lead angle of the spiral in which the line-holding protrusions are placed.

The hollow telescopic fishing rod of another embodiment of this invention realizes improved durability of the line-holding protrusions and easier manufacturing by using twisted yarn for the reinforcing fibers placed inside the line-holding protrusions.

The hollow telescopic fishing rod of yet another embodiment of this invention realizes improved durability of the line-holding protrusions and easier manufacturing by having 50–60% of the volume fraction of the reinforcing fibers in the synthetic resin of the line-holding protrusions composed of the fiber-reinforced resin.

What is claimed is:

1. A hollow telescopic fishing rod comprising:

a fishing rod body having a plurality of hollow fishing rod body sections made from fiber-reinforced resin, each of said hollow fishing rod body sections having a hollow interior with an inner surface, the hollow interiors of said hollow fishing rod body sections defining an internal path for a fishing line, at least one of said hollow fishing rod body sections having an inner surface in which is formed a spiral groove which spirally circumferentially extends generally the length of said one of said hollow fishing rod body sections, said spiral groove defining in cross-section a plurality of fishing-line holding protrusions formed from said fiber-reinforced resin by monobloc forming together with said fishing rod body sections, said fishing-line holding protrusions having a cross-sectional shape which is generally trapezoid such that each of said protrusions is formed with inclined sides, and each protrusion is formed with arc-shaped corners on radially inward ends thereof.

2. The hollow telescopic fishing rod of claim 1 wherein the width of said trapezoid measured between radial outer portions of said spiral groove is about 0.6–1.2 mm.

3. The hollow telescopic fishing rod of claim 1, wherein the height of said trapezoid measured from said spiral groove to said radially inward ends is about 0.2–0.6 mm.

4. The hollow telescopic fishing rod of claim 1 wherein the lead angle of said spiral groove of said line-holding protrusions is no greater than 50 degrees.

5. The hollow telescopic fishing rod of claim 1 wherein said fiber-reinforced resin comprises reinforcing fibers made of twisted yarn.

6. The hollow telescopic fishing rod of claim 1 wherein said fiber-reinforced resin comprises reinforcing fibers selected from the group consisting of carbon fibers, SiC fibers and boron fibers.

7. The hollow telescopic fishing rod of claim 1 wherein said fiber-reinforced resin has a volume fraction of reinforcing fibers of between about 50 and 70%.

8. The hollow telescopic fishing rod of claim 1 wherein said arc-shaped corners on said radially inward ends of said trapezoid are circular arc portions having a radius of from about 0.05 mm to about 2 mm.

9. The hollow telescopic fishing rod of claim 1 further comprising a grip having an aperture, the end of said grip being connected to said fishing rod body, a reel connected to said grip, a line wound around said reel, and a line guide attached to the end of said fishing rod body, said line passing from said reel through said aperture in said grip through the inner path of said fishing rod body and through said line guide to the outside of said fishing rod body.

10. The hollow telescopic fishing rod of claim 1 wherein radially outward corners of each of said protrusions within said spiral groove are generally arc-shaped.

11. The hollow telescopic fishing rod of claim 10 wherein said radially outward corners of each of said protrusions are circular arc portions having a radius of from about 0.05 mm to about 2 mm.

* * * * *